United States Patent

Wittrisch

[11] Patent Number: 6,157,761
[45] Date of Patent: Dec. 5, 2000

[54] REINFORCED COMPOSITE ROD

[75] Inventor: Christian Wittrisch, Rueil Malmaison, France

[73] Assignee: Institut Francais du Petrole, France

[21] Appl. No.: 09/169,144

[22] Filed: Oct. 9, 1998

[30] Foreign Application Priority Data

Oct. 13, 1997 [FR] France .................................. 97 12868

[51] Int. Cl.$^7$ ..................................................... G02B 6/44
[52] U.S. Cl. .......................... 385/107; 385/101; 385/102; 385/113; 166/385; 166/65.1
[58] Field of Search ...................... 385/107, 101, 385/102, 103, 113; 166/385, 65.1

[56] References Cited

U.S. PATENT DOCUMENTS

| | | | |
|---|---|---|---|
| 4,172,106 | 10/1979 | Lewis | 264/1 |
| 4,671,611 | 6/1987 | Allemand et al. | 385/107 |
| 4,679,898 | 7/1987 | Grooten | 385/107 |

FOREIGN PATENT DOCUMENTS

| | | |
|---|---|---|
| 0 352 148 | 1/1990 | European Pat. Off. . |
| 0 405 716 | 1/1991 | European Pat. Off. . |
| 2 708 055 | 1/1995 | France . |
| 3 127 901 | 2/1983 | Germany . |

*Primary Examiner*—Phan T. H. Palmer
*Attorney, Agent, or Firm*—Millen, White, Zelano & Branigan

[57] ABSTRACT

A composite rod rigid in compression is sufficiently flexible to be wound round a reel that is less than three meters in diameter. The rod comprises at least three parts: a core including at least one data transmission element, a layer made of steel reinforcing wires, and a composite layer made of embedded fibers. In a variant, steel wires are substantially parallel to the axis of the core. Application of the rod is to displacement of measuring instruments in a well or pipe comprising a greatly inclined section.

13 Claims, 1 Drawing Sheet

REINFORCED COMPOSITE ROD

FIELD OF THE INVENTION

The present invention relates to a rod of great length, sufficiently flexible to be wound round a reel while being rigid in compression in order to be fed into a pipe of great length, a borehole, a line or a tunnel for example.

BACKGROUND OF THE INVENTION

Document EP-352,148-B1 filed by the applicant describes a semi-rigid composite rod comprising conductors and/or optical fibers integrated in a composite material reinforced by glass, carbon or aramid fibers embedded in a thermoplastic or thermosetting matrix. The rigidity and tensile strength characteristics obtained by such a rod are suited to most applications, in particular in fields where the fluids present around the rod have no effect on the mechanical strength of the composite material.

However, the reinforcing fibers, glass fibers or others, may embrittle during an application. In fact, one can mention by way of example the fact that glass fibers subjected to mechanical stresses in a salted and warm aqueous fluid environment may deteriorate. Partial or total breakage of the reinforcing fibers also leads to deterioration of the conductors and of the optical fibers. This breakage, which can lead to the loss of a rod section in the well or the pipe, can have serious consequences for ongoing operations, and fishing operations in the well bottom can be very difficult or even impossible.

SUMMARY OF THE INVENTION

The present invention describes a rod, improved in relation to the rod described in document EP-352,148-B1, which comprises an optimized mechanical reinforcement in order notably to prevent the aforementioned drawbacks.

The present invention thus relates to a semi-rigid composite rod comprising a core made up of at least one electrical, optical or fluid data transmission line, a layer of reinforcing fibers embedded in a plastic matrix which provides a determined rigidity while allowing it to be wound round a drum. The rod also comprises at least one steel wire reinforcing layer placed above said core, such that the tensile strength of said reinforcing layer is at most half the tensile strength of said fiber layer.

The reinforcing layer made of steel wires can consist of a single row of contiguous wires on the outer surface of said core.

The reinforcing steel wires can be arranged substantially longitudinally.

The tensile strength of the reinforcing layer can be at most a quarter of the tensile strength of the fiber layer.

According to a variant, an external sealing sheath can be extruded above the reinforcing fiber layer. This sheath can be made of thermoplastics, a PVC for example, intended notably to protect the reinforcing fiber layer and the thermosetting matrix from chemical attacks by fluids or UV radiations.

The invention can be applied to measuring means or instruments displacement operations in a greatly inclined pipe or well.

BRIEF DESCRIPTION OF THE DRAWINGS

Other features and advantages of the present invention will be clear from reading the description hereafter of non limitative embodiment examples of the rod according to the invention, with reference to the accompanying drawings wherein.

DETAILED DESCRIPTION OF THE INVENTION

Figure 1:
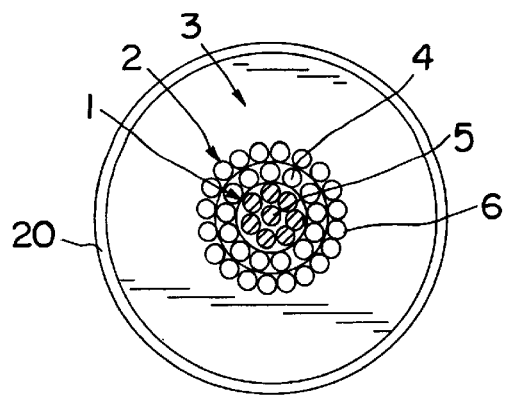
FIG. 1 shows the semi-rigid rod in cross-section.

FIG. 1 shows an example of the structure of a semi-rigid rod according to the invention. Said rod is made up of at least three elements:

Central core 1 is the part comprising the information or control transmission means. This core generally comprises at least one electric conductor. In some cases, as shown in FIG. 1, there are seven electric conductors 4 surrounding an optical fiber 5. There may also be fluid lines in this core. The core can be coated with a coppered film 8 for electrical screening of the conductors 4. Mass continuity wires can also be used.

Part 2 is made up of metal reinforcing wires. The section of wires 6 can be circular, square, rectangular or other. The total surface area of the section of the reinforcing wires is determined as a function of the tensile strength that is to be always applied to the rod, even if composite material 3 is partly or totally broken.

Part 3 is made up of a composite material including glass, carbon or aramid reinforcing fibers embedded in a thermoplastic or thermosetting resin matrix, an epoxy, phenolic, unsaturated polyester or vinylester resin for example. Most of the fibers are arranged longitudinally, but a certain number of fibers can be arranged helically. The reinforcing fiber and matrix proportion is so determined that the stiffness of the rod is great while allowing said rod to be wound round a drum whose diameter ranges between about 1.5 and 3 meters, and is preferably close to 2 meters. The bending due to winding must not lead to a deformation of the rod constituents beyond the yield limit. Thus, the section of composite part 3 is relatively large in proportion to the diameter of the rod, which provides a tensile strength (considering the mechanical characteristics of the fibers) which exceeds the strength required to remove the rod and the tools fastened to the end thereof.

Reference number 20 relates to an optional additional layer deposited by extrusion in order to better insulate composite layer 3 from the exterior fluids, or to limit abrasion.

An example of dimensional and mechanical characteristics of a reinforced semi-rigid rod is given hereafter:

| | |
|---|---|
| Outside diameter of part 1 | 5.5 mm |
| Thickness of reinforcing wires 6 | 1 mm |

The reinforcing wires are arranged contiguously on the outside of the core

Elastic modulus of the steel of the reinforcing wires: 500 to 2000 MPa, preferably about 1700 MPa

| | |
|---|---|
| Outside diameter of the rod | 19 mm |
| Linear weight of the rod | 0.6 to 1 kg/m |
| Proportion of glass fibers | at most 80% |
| Vinylester resin matrix | |

Tensile strength of the composite alone (glass fibers): about 8 tons

Tensile strength of reinforcing wires 6: 2 to 4 tons.

It can be noted that the rod above weighs between 600 kg and 1000 kg for 1000 m in length. The weight of the instruments (measuring sondes for example) that can be fastened to the end of the rod does not exceed 800 kg. The tensile capacity of the reinforcing wires generally ranges between 2 and 4 t, but it could be increased by selecting other steels with a higher elastic limit. This capacity is thus compatible with rod lengths of several thousand meters. Of course, the fact that the line is filled with a liquid whose density decreases the weight to be pulled to the surface has to be taken into account.

Figure 2A:
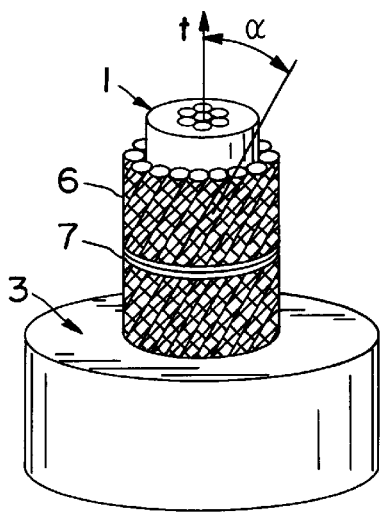
FIGS. 2A and 2B diagrammatically show the layout of the reinforcing wires.
Figure 2B:
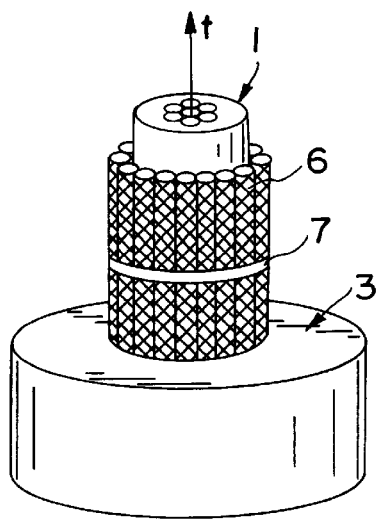

FIGS. 2A and 2B diagrammatically show the layout of the layer(s) 2 of reinforcing wires 6 which are arranged on the outer surface of core 1 of longitudinal axis t. In FIG. 2A, the reinforcing wires are positioned helically, forming an angle α with direction t. This angle α must be preferably less than 35° since the function of these wires is to withstand longitudinal tensile stresses.

For manufacturing reasons, it may be necessary to hold wires 6 through the agency of fastening means 7 around the wires. These means can be reinforced sticking strips with an annular layout or wound substantially continuously round layer 2.

FIG. 2B shows a layout of reinforcing wires positioned longitudinally substantially parallel to the direction of axis t. In this case, the wires are also held by fastening means 7. Thus positioned, the steel wires generate no torsion when the rod is under tension.

Parts 1 and 2 are thereafter coated by composite material 3 according to the pultrusion technique. It is clear that the reinforcing wires are then embedded in the matrix with which the fibers reinforcing said composite material are coated.

A semi-rigid rod according to the invention thus has a great stiffness, a relative lightness in relation to a steel coiled tubing, a smooth outer surface which has a reduced coefficient of friction with the walls of the pipe or of the well into which the rod according to the invention is fed. Under normal operating conditions, all the stresses, including the tensile stresses, are supported by the composite material. In case of partial or total deterioration of the composite material, reinforcing steel wires 6 progressively take up the tensile stress. In case of breakage of the composite fibers, a mechanical continuity through the reinforcing wires of part 2 and the continuity of the conductors of core 1 will remain. This continuity allows the measuring instruments to be pulled out of the well within the tensile limit of the steel wires of reinforcing layer 2.

Figure 3:
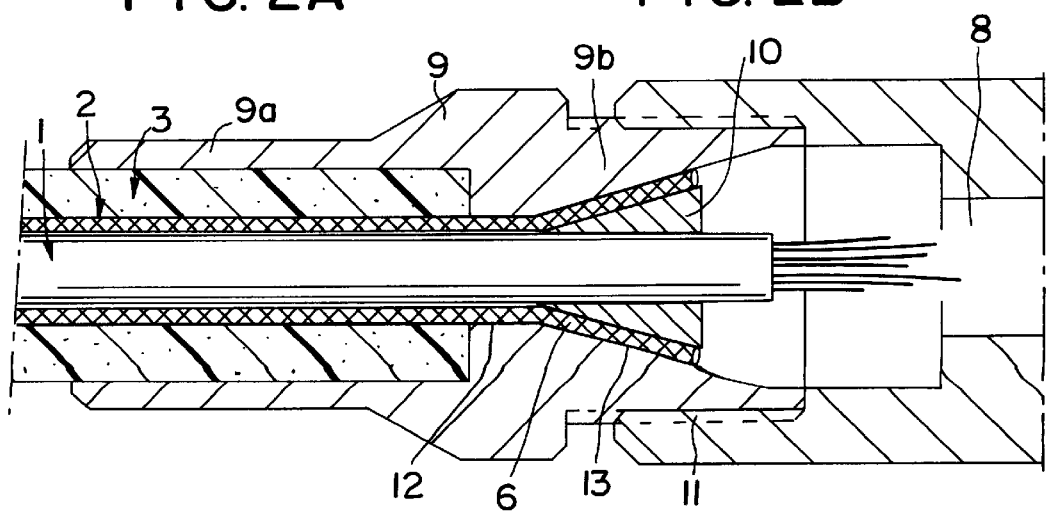
FIG. 3 shows in lengthwise section an example of a connection means at the end of the rod according to the invention.

FIG. 3 diagrammatically illustrates a means allowing mechanical connection with instruments 8 fastened to the lower end of the rod according to the invention. The connection means can also be used for connecting two semi-rigid rod sections or a rod section with a coiled tubing or conventional operating rods. Documents EP-352,148-B1 and FR-2,708,055, mentioned here by way of reference, which describe mechanical connection means on prior semi-rigid rods, can be consulted. With a rod including both reinforcing steel wires and a composite material, epoxy and glass fibers for example, connection can preferably be achieved both on the steel wires and on the composite material. In FIG. 3, a sleeve 9 comprising two elements 9a and 9b is slipped onto an end of a semi-rigid rod according to the invention. Element 9a is crimped and/or stuck onto the outer surface of the rod end, for example according to the description in document FR-2,708,055. Element 9b comprises a central orifice allowing passage of core 1, a female conical surface 13 and a thread 11 for assembly with the upper end of instrument 8. Steel wires 6 are wedged on surface 13 by means of a cone 10.

Without departing from the scope of the invention, two connection means can be connected together by means of thread 11 so as to link two semi-rigid rod sections. Furthermore, if the rod comprises two superposed reinforcing wire layers, a coaxial double-cone wire wedging system can be used.

Such a semi-rigid rod is used for measuring operations in pipes or wells where setting of the instruments is problematic because they cannot be lowered by means of their own weight, for example because the pipe or the well comprises a gretaly inclined and even horizontal section. The rod according to the invention allows to exert a thrust on the instruments so as to displace them, then a traction to pull them up to the surface, or to drive them out of the pipe. Operations are facilitated by the fact that the rod is wound round a drum with a diameter of generally about 2 meters. With the rod according to the invention, the following applications are possible, but in no way limited thereto: logging operations in a greatly inclined oil well, setting of permanent pick-ups in production tubings, internal control and inspection -in pipelines or flexible pipes, geological measurements in boreholes prior to tunnelling etc.

What is claimed is:

1. A semi-rigid composite rod for insertion into a well for the purpose of making measurements and interventions within the well comprising:

a core (1) wherein the core (1) has at least one electrical, optical or fluid data transmission line (5), surrounded by electrical conductor array (4), the core being surrounded by a layer of reinforcing fibers embedded in a plastic matrix (3) which surrounds the electrical conductor array (4) providing a determined rigidity while allowing elastic winding round a drum, the composite rod further comprising at least one reinforcing layer (2) of steel wire (6) positioned around said core, the tensile strength of said reinforcing layer (2) being at most half the tensile strength of said fiber layer in the plastic matrix (3).

2. A semi-rigid rod as claimed in claim 1, wherein said reinforcing steel wire layer is made up of a single row of contiguous wires on the outer surface of said core.

3. A semi-rigid rod as claimed in claim 2, wherein said reinforcing steel wires are positioned substantially longitudinally.

4. A semi-rigid rod a claimed in claim 3, wherein the tensile strength of said reinforcing layer is at most a quarter of the tensile strength of said fiber layer in the plastic matrix.

5. A semi-rigid rod as claimed in claim 4, wherein an external sealing sheath is extruded around the reinforcing fiber layer.

6. Application of the rod as claimed in claim 5 to the displacement of measuring means in a greatly inclined pipe or well.

7. The semi-rigid composite rod of claim 1, wherein the layer of reinforcing fibers embedded in the plastic matrix has a substantially greater cross-sectional area than the core.

8. The semi-rigid composite rod of claim 7, wherein the material of the reinforcing fibers is selected from the group consisting of glass, carbon and aramid, and the plastic material of the plastic matrix is comprised of materials selected from the group consisting of epoxy, phenolic resin, unsaturated polyester and vinylester.

9. A semi-rigid rod as claimed in claim 1, wherein an external sealing sheath is extruded around the reinforcing fiber layer in the plastic matrix.

10. A semi-rigid composite rod of claim 1 further including an external layer surrounding the fiber layer in the plastic matrix.

11. A semi-rigid rod as claimed in claim 1, wherein said reinforcing steel wires are positioned substantially longitudinally.

12. A semi-rigid rod as claimed in claim 1, wherein the tensile strength of said reinforcing layer is at most a quarter of the tensile strength of said fiber layer.

13. Application of the rod as claimed in claim 1 to the displacement of measuring means in a greatly inclined pipe or well.

* * * * *